(12) United States Patent
Thaler

(10) Patent No.: US 7,999,428 B2
(45) Date of Patent: Aug. 16, 2011

(54) APPARATUS FOR THERMOMECHANICAL DECOUPLING OF THE HOUSING AND STATIONARY PART OF A ROTATING MACHINE

(75) Inventor: Georg Thaler, Graz (AT)

(73) Assignee: VA Tech Hydro GmbH, Vienna (AT)

(*) Notice: Subject to any disclaimer, the term of this patent is extended or adjusted under 35 U.S.C. 154(b) by 366 days.

(21) Appl. No.: 12/192,074

(22) Filed: Aug. 14, 2008

(65) Prior Publication Data
US 2009/0108704 A1 Apr. 30, 2009

(51) Int. Cl.
*H02K 5/00* (2006.01)
(52) U.S. Cl. .................. 310/89; 310/65
(58) Field of Classification Search .......... 310/89, 310/65
See application file for complete search history.

(56) References Cited

U.S. PATENT DOCUMENTS

| | | | | |
|---|---|---|---|---|
| 649,574 A | * | 5/1900 | Foshag | 310/65 |
| 662,010 A | * | 11/1900 | Mix et al. | 310/65 |
| 662,928 A | * | 12/1900 | Geisenhoner | 310/65 |
| 890,577 A | * | 6/1908 | Richards | 310/65 |
| 1,882,487 A | * | 10/1932 | Dupont | 310/65 |
| 2,611,797 A | | 9/1952 | Beckwith et al. | |
| 3,515,916 A | * | 6/1970 | Kovacs | 310/65 |
| 5,796,191 A | | 8/1998 | Schwanda | |
| 6,175,176 B1 | * | 1/2001 | Vogler | 310/156.16 |

FOREIGN PATENT DOCUMENTS

| | | | |
|---|---|---|---|
| DE | 1 195 401 | | 6/1965 |
| DE | 28 52 391 | | 6/1979 |
| DE | 3920785 A1 | * | 3/1990 |
| EP | 0 755 109 A2 | | 1/1997 |
| JP | 54157204 A | * | 12/1979 |
| JP | 54158608 A | * | 12/1979 |
| JP | 56-107767 | | 8/1981 |
| JP | 02193545 A | * | 7/1990 |
| JP | 04105533 A | * | 4/1992 |
| JP | 08182240 A | * | 7/1996 |
| JP | 10215541 A | * | 8/1998 |

* cited by examiner

*Primary Examiner* — Quyen Leung
*Assistant Examiner* — Alex W Mok
(74) *Attorney, Agent, or Firm* — Nixon & Vanderhye P.C.

(57) ABSTRACT

An apparatus is described for thermomechanical decoupling of the housing and stationary part of a rotating machine, in particular of a dynamoelectric machine. The apparatus has at least one rotating shell, and in that this apparatus can on the one hand be attached to the housing and on the other hand to the stationary part, such that the rotating shell extends in the axial direction even in the mounted state. This results in centered bearing, which is stiff against lateral movement of the stationary part, in particular of the laminated core, while providing little impediment to the thermal growth of the stationary part.

11 Claims, 3 Drawing Sheets

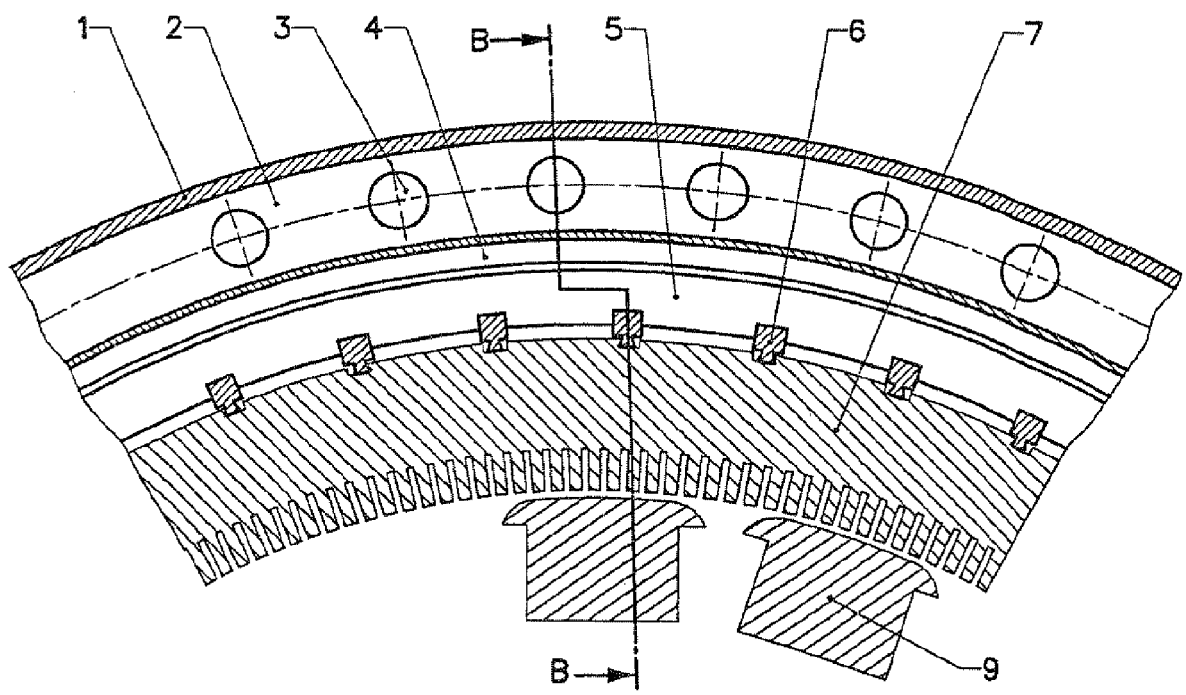

APPARATUS FOR THERMOMECHANICAL DECOUPLING OF THE HOUSING AND STATIONARY PART OF A ROTATING MACHINE

CROSS RELATED APPLICATION

This application is the US national phase of international application PCT/EP2007/001218 filed 13 Feb. 2007 which designated the U.S. and claims benefit of European Application No. A 239/2006 filed 15 Feb. 2006, the entire contents of both are hereby incorporated by reference.

BACKGROUND OF THE INVENTION

The invention concerns an apparatus for thermo-mechanical decoupling of the housing and stationary part of a dynamo-electric rotating machine, an application of this apparatus and an appropriate rotating machine.

The invention relates to rotating machines where a stationary part (stator or stator core) is to be supported in a casing, and thus, it concerns any kind of motor or generator. The rotating part, also referred to as rotor, is arranged within the stator.

This connection between the stator core and the housing shell is particularly advantageous when the differences in temperature and radial stiffness of the casing and the stator core are high.

This is particularly true of bulb turbine generators, where the housing is cooled by the passing water, which is normally cool, but where the stator core heats up during operation. In addition, the water pressure acting on the housing shell exerts a radial load on the housing and stator core. Both the temperature difference and the possible water pressure result in tangential compressive strains in the stator core that can lead to mechanical instability of the stator core. This may result in the bulging of the sheets or sheet layers of the stator core. Heavy bulging may damage the sheets, the winding and other parts of the generator.

Basically, there is a state of the art showing a non-rigid stator position, which goes far back in time. A dynamo-electric machine is known from GB 800613, which has internal frame rings that are connected to the stator core frame rings via spring-type devices. The finish of these spring-type devices is not disclosed. However, using just any type of spring-like devices will not ensure that the stator core position is sufficiently secure in axial direction and that the centered alignment is maintained.

Pamphlet DE 2852391 A1 discloses a stator casing with two hollow cylinders which are thermally insulated against each other. Due to this insulation, the inner hollow cylinder has approximately the same temperature as the stator core and thus the temperature-related compressive strains are minimized. The inner hollow cylinder must, however, have a very solid design because it is attached only at its ends and must take up all forces.

Pamphlet JP 56107767 A discloses a stator consisting of two cylinders which are connected to each other via axially mounted ribs that are arranged in a triangle. The stator core ledges are fixed to the cylinder between the inner vertexes of the triangles, in order to achieve higher radial flexibility.

SUMMARY OF THE INVENTION

An apparatus for thermo-mechanical decoupling of the casing and the stationary part (stator) of a rotating machine is disclosed herein, with which apparatus a centered support that is rigid against lateral displacement of the stator, especially the stator core, is achieved, while hampering especially the thermal growth of the stator only in a minor way.

Using the rotating shell(s) may result in thermo-mechanical decoupling which drastically reduces the tangential compressive strains in the stator, e.g. the stator core.

The rotating shell is a thin-walled rotating body, which, geometrically speaking is (ideally) created by rotating a generatrix (a general surface) around a rotation axis (in the mounted state, the rotation axis of the rotating machine). The rotating shell can also be designed as a polygon, and thus be approached by a polygon. The rotating shell can be continuously ring-shaped (=closed over the entire circumference), but a similar effect can be achieved if only parts of these rings (ring segments) or parts of the polygon are used and thus some elements are missing.

The apparatus disclosed herein may consist of just one rotating shell, but it is also possible to arrange several rotating shells and to inter-connect them.

The rotating shell should preferably not only extend radially from the housing inward or outward (in the mounted state, toward the rotation axis of the rotor) as it would be the case with an annulus, but also axially (parallel to the rotation axis of the rotor in the mounted state). When the stator heats up and expands radially, it will press radially against the rotating shell and the rotating shell will be pressed outward at the attachment to the stator and thus will yield similarly to a leaf spring.

The rotating shell is therefore normally made of high-strength material of suitable elasticity, for instance, sheet steel.

The rotating shell may also be provided with vents for aeration.

As one solution that is easy to manufacture, the rotating shell may be a cylinder shell or truncated cone shell. Both the cylinder and truncated cone shells can be approached through facet shapes, some facet elements can be omitted.

The generatrix of the rotating shell can, of course, also be curved in one or several curves.

Naturally, the generatrix of the rotating shell can be composed of straight and curved lines.

It is also possible to combine several of the above-described rotating shells into an apparatus, for instance, two concentric cylinder shells. These rotating shells can be spaced, using spacing elements, such as spacer rings, in radial direction from each other. In a very simple embodiment, the spacing elements can have the shape of an annulus or polygon. They can also have openings.

If at least one truncated cone shell is used as rotating shell(s), these can be connected with each other either via spacer rings or directly.

The rotating shell can have openings enabling the passage of a cooling medium, for instance, air.

A dynamo-electric rotating machine, comprising at least a housing and a stationary part, is characterized in that this contains an apparatus for thermo-mechanical decoupling as described above (in the simplest case, a rotating shell), this apparatus being attached on the one hand to the housing and on the other hand to a holding ring of the stationary part.

The housing may have a housing shell with support elements pointing inward, and the apparatus for thermo-mechanical decoupling (in the simplest case, a rotating shell), may be attached to the support elements.

The housing shell can take the shape of a rotated line or be approached through facets. The housing shell may be provided with vents. It transfers the loads of the holding devices for attaching the stator to the foundation.

In a very simple embodiment, the support elements can be approached via the shape of an annulus or polygon. The support elements can have vents for aeration in the axial direction.

The shape of the support elements depends on the existing geometrical conditions and the physical requirements and can be designed approximately independently from the stator. In particular, physical requirements have to be taken into account: ventilation, mechanical stability (i.e. bulging on account of the acting water pressure in bulb turbine generators, housing ovality due to the buoyancy in bulb turbine generators, axial stiffness, radial stiffness, strength. Dimensional stability must be ensured at any rate.

Support elements are not necessarily required, since the apparatus for thermo-mechanical decoupling (in the simplest case, a rotating shell) can be fixed directly to the housing shell.

The stationary part has holding rings, and the apparatus for thermo-mechanical decoupling (in the simplest case, a rotating shell) is fixed to the holding rings. The holding rings can also be annulus-shaped or polygonal.

The shape of the holding rings depends on the existing geometrical conditions and the physical requirements of the stator core and can be designed approximately independently of the housing and of the support elements, if any. The physical requirements for this are: vents for aeration, dimensional stability, acceptable dynamic behaviour in operation.

As a particularly simple embodiment, the holding rings can be annulus-shaped or polygonal. The radial height and thickness of the holding rings should be designed such that the dimensional stability of the stator core (e.g. roundness) is ensured. To achieve this, additional holding rings, which are not connected to the rotating shells, can be used.

When using a truncated cone shell as rotating shell, support elements and/or holding rings need not be used.

The support elements and the holding rings may be axially staggered in relation to each other but not necessarily so.

If more than two support elements and/or holding rings are used, the spacing between the support elements and/or the holding rings may be different in the axial direction. The shape, axial height and sheet thickness of the rotating shells may differ between various support elements and holding rings.

The stationary part can comprise a stator core which is connected to the holding rings with stator core ledges. The holding ring serves for receiving the stator core ledges and enables radial spacing to the rotating shell. The stator core ledges serve as connecting elements between the rotating shell and the holding ring and stator core. They also serve as guides for the single stator core segments.

The apparatus for thermo-mechanical decoupling (in the simplest case, a rotating shell) may extend over several support elements and/or holding rings in the mounted state.

The rotating machine may be designed as a generator, for instance, a bulb turbine generator.

It is clear that the apparatus for thermo-mechanical decoupling disclosed herein may be mounted between the housing and the stationary part of a dynamo-electric rotating machine.

The dynamo-electric machine disclosed herein can be used especially advantageously as generator, in particular, as bulb turbine generator.

SUMMARY OF THE DRAWINGS

The invention is represented by way of example and schematically using the attached FIGS. 1a, 1b, and 2 and explained in the following description.

FIG. 2, a cross-section through the generator along line A-A in FIG. 1a.

DETAILED DESCRIPTION OF THE INVENTION

Figure 1A:
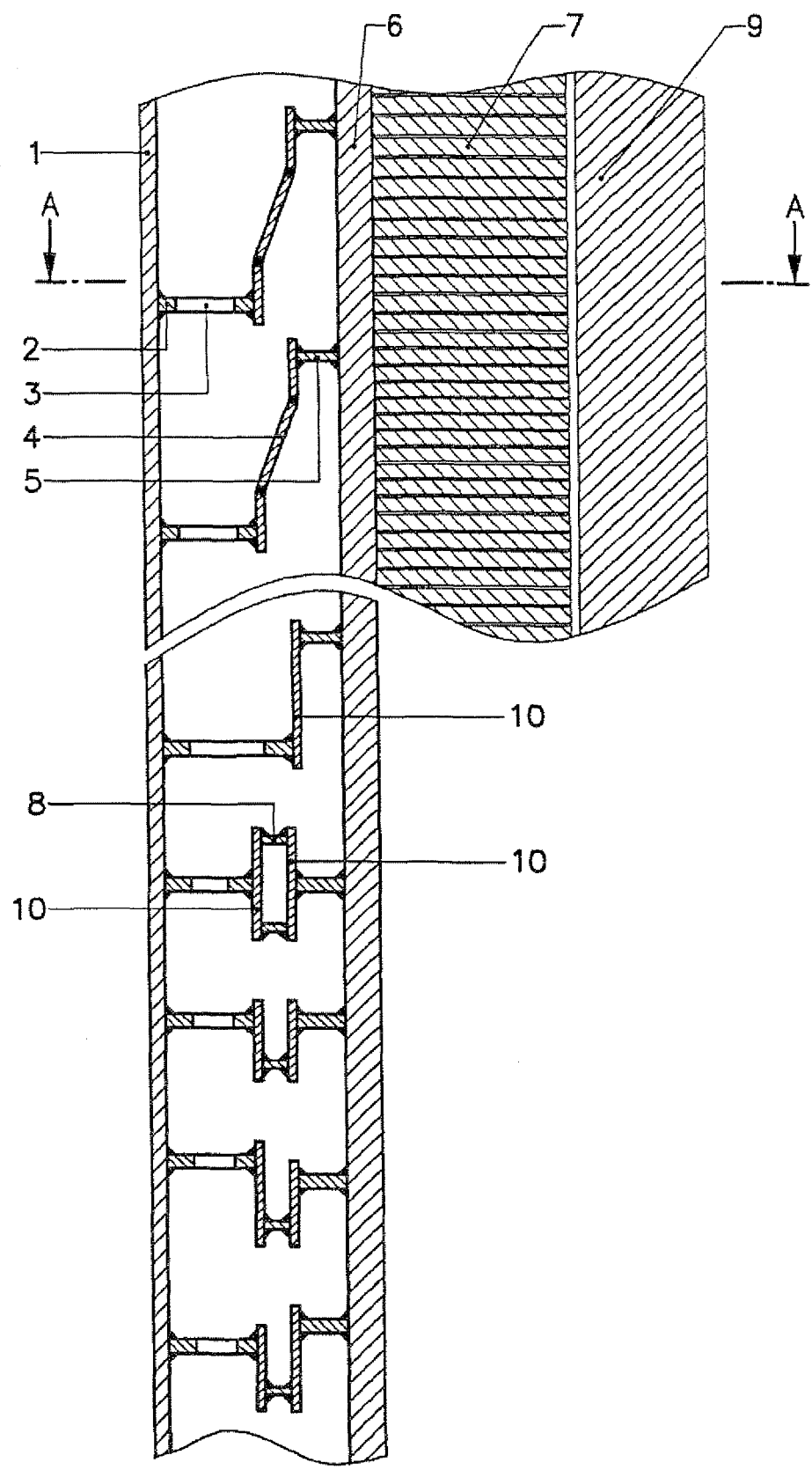
FIGS. 1a and 1b show a cross-section of a generator along line B-B.
Figure 1B:
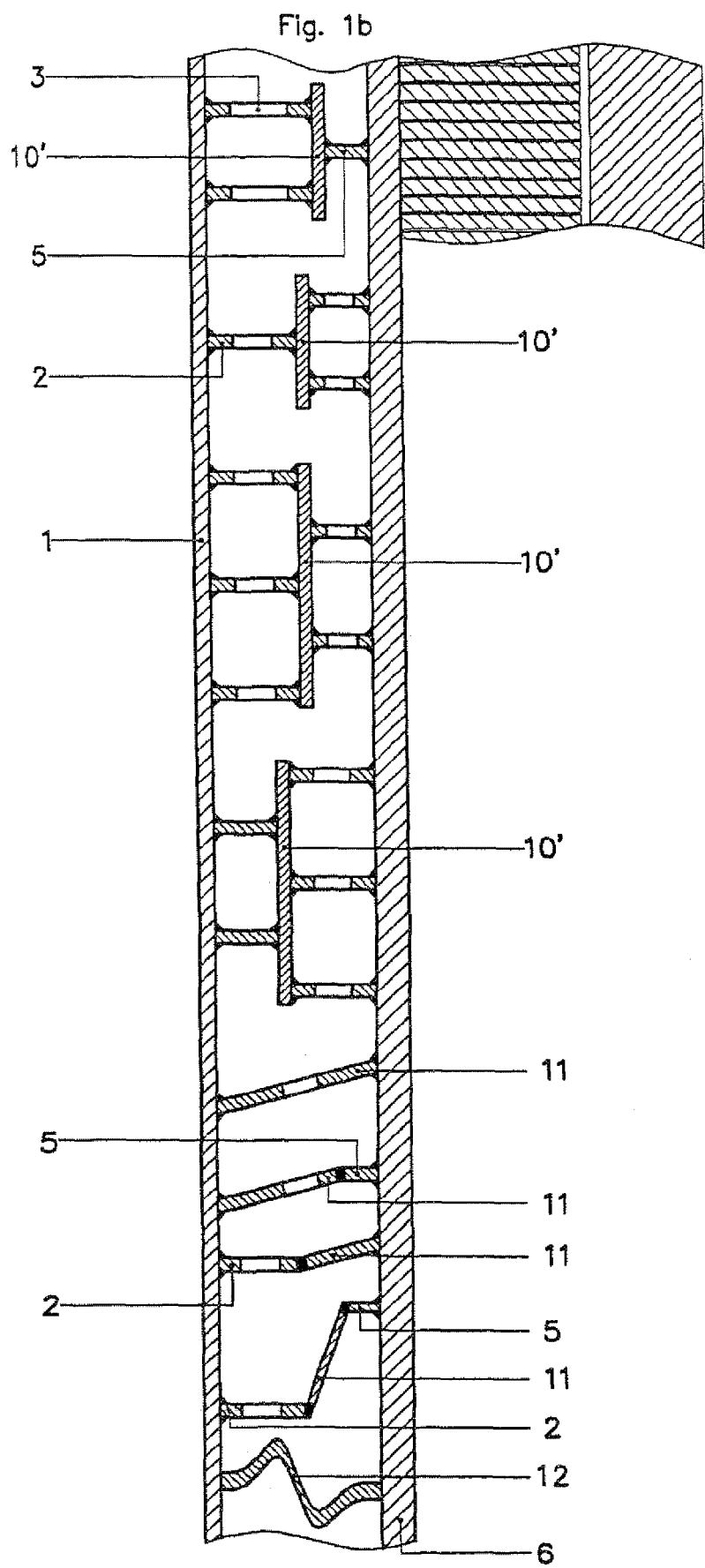

Annulus-shaped support elements 2 are fixed to the generator in FIG. 1a and 1b on the inside of the housing shell 1. They are provided with possible vents 3 for the axial transport of the cooling medium through the support elements 2 for cooling the dynamo-electric machine, especially the stator core 7. One of the ends of the rotating shell 4 is connected to the support element 2, the other end to the holding ring 5. Holding ring 5 is connected to the axially arranged stator core ledges 6, which carry the stator core 7 of the stator. The rotor pole 9 can be rotated around a rotation axis (not shown) of the rotor, this axis running vertically from top down in the drawing level.

The combination of support element 2, rotating shell 4 and holding ring 5 repeats itself at identical distances in the upper section of FIG. 1a, which is separated from the lower part by a curved cross-section. Holding ring 5, belonging to one rotating shell 4, is axially offset in relation to the pertinent support element 2. Rotating shell 4 consists of two cylinder shell elements that are connected with each other by a truncated cone shell element.

In this case, the diameter of rotating shell 4 decreases from the support element 2. Basically, it is also possible for the diameter of rotating shell 4 to increase from the support element 2.

The lower part of FIG. 1a shows examples of different other embodiments of the apparatus for thermo-mechanical decoupling. Only one device is represented in each case, which would then repeat itself in the axial direction. Different embodiments can be combined in one generator.

The first embodiment below the curved cross-section consists of a rotating shell in the shape of a cylinder shell 10, which is connected to a support element 2 and a holding ring 5, which is offset in the axial direction.

Below this, an apparatus having two concentric cylinder shells 10 of the same height in the axial direction, which are spaced with two annulus-shaped spacing elements 8, is shown. Holding ring 5 and support element 2 are attached to the centre of the cylinder shells 10 and have the same height in the axial direction. In the embodiment below, only one spacing element 8 is provided near one side of the cylinder shells 10, while holding ring 5 and support element 2 are attached to the other side of the cylinder shells 10.

In the next embodiment below, the two cylinder shells 10 are not of the same height in the axial direction, but here, too, holding ring 5 and support element 2 are attached to one side of the cylinder shell 10, and as a consequence, holding ring 5 and support element 2 are axially offset to each other.

In the bottom-most embodiment, the position of the two cylinder shells 10 which are different in height in the axial direction is reversed, and consequently, the positions of holding ring 5 and support element 2 are reversed.

FIG. 1b also shows different embodiments of the apparatus for thermo-mechanical decoupling from top down, with only one apparatus shown in each case, which may also repeat itself in the axial direction. Here, too, several different embodiments may be realised in one generator.

The top-most embodiment shows a cylinder shell 10' which extends over two support elements 2, each of which is arranged near the side of the cylinder shell 10'. A holding ring 5 is attached at the centre of the cylinder shell. Support elements 2 have vents 3.

Below this, a cylinder shell 10' is shown, which is supported by two holding rings 5 and a support element 2.

The following embodiment shows a cylinder shell 10', which is kept in place by three support elements 2, spaced equally from each other, and two holding rings 5. Several support elements and holding rings can also be connected with each other via a cylinder shell, e.g. four support elements 2 and three holding rings 5.

The reverse case is shown below. Two support elements 2 hold a cylinder shell 10', which is held by three holding rings 5 that are arranged at identical spaces. However, several support elements and holding rings can also be connected with each other via a cylinder shell, e.g. three support elements 2 and four holding rings 5.

Then follows a rotating shell in the shape of a simple truncated cone shell, which is mounted directly to the housing shell 1 and/or the stator core ledges 6 without holding rings, and which also has vents.

Below this, two further variants are represented, each with a truncated cone shell as rotating shell. The upper variant shows a truncated cone shell 11 whose outside is directly attached to the housing shell 1, and whose inside is attached to the stator core ledge 6 via a holding ring 5. The truncated cone shell has vents. In the lower representation, the outside of truncated cone shell 11 is attached to a support element 2, and its inside is directly connected to the stator core ledges 6. The support element is provided with vents.

Below this, the truncated cone shell 11 is connected to support element 2 and holding ring 5. The support element 2 is provided with vents.

Finally, the bottom-most embodiment shows a rotating shell 14 with multiple curves, which is also attached directly to the housing shell 1 and/or stator core ledges 6.

It can be seen in FIG. 2 that support element 2 is arranged inside housing shell 1 over the entire circumference, with support element 2 possibly having vents 3. Rotating shell 4 is continuous over the entire circumference. Stator core ledges 6 are attached to the holding ring 5 at identical spaces. The stator core 7 is attached to these. The electrical windings are not shown here, nor is the rotation axis of pole 9.

| Bezugszeichenliste: | List of references |
|---|---|
| 1. Gehäusemantel | Housing shell |
| 2. Gehäusespante | Support element |
| 3. Belüftungsöffnung | vent |
| 4. Halterung | Holding ring |
| 5. Blechpaketleiste | Stator core ledge |
| 6. Blechpaket | Stator core |
| 7. Distanzelement | Spacing element |
| 8. Pol des Rotors | Rotor pole |
| 9. Zylindermantel 10' | Cylinder shell 10' |
| 10. Zylindermantel | Cylinder shell |
| 11. Kegelstumpfmantel | Truncated cone shell |
| 12. mehrfach gekrümmte Rotationsschale | Rotation shell curved in several curves |

The thermo-mechanical decoupling apparatus disclosed herein is for decoupling of a housing 1 and 2, and a stationary part 5, 6 and 7 of a dynamo-electric rotating machine. The apparatus is characterized as having at least one rotating shell 4 attached to the housing 1 and 2 on one side and to a holding ring 5 of the stationary part 5, 6 and 7 or a spacing element 8 on the other side, such that the rotating shell extends in the axial direction in the mounted state.

The rotating shell may be, for example, a cylindrical shell 10, a truncated cone shell 11 or an irregular annulus 12 that has a cross-section formed by multiple curves, as shown in FIG. 1b. Further, the generatrix of the rotating shell 4 may be curved in one or several curves. In addition, the rotating shell may be combinations of rotating shells, such as concentric cylindrical shells 10, which are radially spaced by two spacing elements 8. The rotating shell may have openings and the shell may have a continuous ring shape or comprise several ring segments.

A dynamo-electric rotating machine is disclosed that may comprise at least a housing 1 and 2 and a stationary part 5, 6 and 7. The machine includes a thermo-mechanical decoupling apparatus having a rotating shell 4 attached to the housing 1 and 2 on one side, and to a holding ring 5 of the stationary part 5, 6 and 7 or a spacing element 8 on the other side. The housing may include a housing shell 1 with inward-pointing support elements 2. The apparatus for thermo-mechanical decoupling may be fixed to the support elements 2. The stationary part may comprises a stator core 7 which is connected to the holding rings 5 with stator core ledges 6. Further, a rotating shell 10' (FIG. 1b)of the apparatus for thermo-mechanical decoupling may extend over several support elements 2 and holding rings 5 in an axial direction when in a mounted state.

The dynamo-electric machine may be, for example, a generator, such as a bulb turbine generator. The thermo-mechanical decoupling apparatus may be used for mounting between the housing 1, 2 and a holding ring 5 of the stationary part 5, 6 and 7 of a dynamo-electric rotating machine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A dynamo-electric rotating machine comprising:
   a housing for a stationary part of the machine, wherein the stationary part is radially inward of the housing;
   a holding ring attached to and extending radially outward of the stationary part;
   a rotating shell between the housing and the stationary part, the rotating shell having a first connection point attached to a radially outer edge of the holding ring and a second connection point attached to at least one of a radially inner side of the housing and a radially inwardly extending annular support element fixed to the inner side of the housing, wherein the first connection point and the second connection point are offset from each other in at least one of a radial or axial direction and wherein the rotating shell thermally decouples the housing and the stationary part.

2. The dynamo-electric rotating machine according to claim 1, wherein the shell is fixed to the support elements.

3. The dynamo-electric rotating machine according claim 1 wherein the stationary part comprises a stator core having a stator core ledge connected to the holding ring.

4. The dynamo-electric rotating machine according to claim 1 wherein the shell extends over several support elements and holding rings in an axial direction of the machine in a mounted state.

5. The dynamo-electric rotating machine according to claim 1 wherein the machine is a generator.

6. A dynamo-electric rotating machine according to claim 1 wherein the machine is a bulb turbine generator.

7. The dynamo-electric rotating machine of claim 1 wherein the first and second connection points are offset in both a radial direction and an axial direction.

8. The dynamo-electric rotating machine as in claim 1 wherein the rotating shell includes concentric cylindrical shells separated by and attached to a spacing element between the cylindrical shells, wherein the first connection point is on an inner one of the cylindrical shells and the second connection point is on an outer one of the cylindrical shells.

9. The dynamo-electric rotating machine as in claim 1 wherein the shell has a truncated conical shape.

10. The dynamo-electric rotating machine as in claim 1 wherein the shell has a cross-sectional shape formed by multiple curves.

11. A dynamoelectric machine comprising:
a housing enclosing a stationary part of the dynamoelectric machine;
a holding ring extending radially outward from the stationary part;
a rotating shell between the housing and the stationary part, the rotating shell including a first connection point attached to a radially outer edge of the holding ring and a second connection point attached to at least one of the housing and a radially inwardly extending annular support element fixed to the housing, wherein the first connection point and the second connection point are offset from each other in at least one of a radial or axial direction and wherein the rotating shell thermally decouples the housing and the stationary part.

* * * * *

UNITED STATES PATENT AND TRADEMARK OFFICE
CERTIFICATE OF CORRECTION

| | | |
|---|---|---|
| PATENT NO. | : 7,999,428 B2 | Page 1 of 1 |
| APPLICATION NO. | : 12/192074 | |
| DATED | : August 16, 2011 | |
| INVENTOR(S) | : Georg Thaler | |

It is certified that error appears in the above-identified patent and that said Letters Patent is hereby corrected as shown below:

Please add the following information to the Title page of Patent No. 7,999,428 at INID code (30):

--(30)   Foreign Application Priority Data
15 February 2006 (AT)   A 239/2006
13 February 2007 (EP)   PCT/EP2007/001218--

Signed and Sealed this
Twentieth Day of December, 2011

David J. Kappos
*Director of the United States Patent and Trademark Office*